United States Patent [19]
Köpl et al.

[11] Patent Number: 5,447,062
[45] Date of Patent: Sep. 5, 1995

[54] APPARATUS FOR MEASURING QUANTITIES OF LIQUID IN GASOLINE PUMPS OF MOTOR VEHICLE FILLING STATIONS

[75] Inventors: Manfred Köpl, Bochum; Bernhard Hüster; Alfons Harding, both of Borchen/Alfen; Werner Moser, Wendelstein; Hans-Ulrich Bloss, Nürnberg, all of Germany; Klaus Albrecht, Lustenau, Austria

[73] Assignee: Tankanlagen Salzkotten GmbH, Salzkotten, Germany

[21] Appl. No.: 107,753

[22] PCT Filed: Dec. 16, 1992

[86] PCT No.: PCT/EP92/02926
§ 371 Date: Jan. 31, 1993
§ 102(e) Date: Jan. 31, 1994

[87] PCT Pub. No.: WO93/12405
PCT Pub. Date: Jun. 24, 1993

[51] Int. Cl.6 .......................... G01F 3/04; G01F 15/06
[52] U.S. Cl. ..................................... 73/261; 73/861.78
[58] Field of Search ................. 73/861.77, 861.78, 261, 73/861.02, 861.03

[56] References Cited

U.S. PATENT DOCUMENTS

| | | | |
|---|---|---|---|
| 2,079,083 | 5/1937 | Montelius | 73/261 |
| 3,372,591 | 3/1968 | Clinton et al. | 73/861.78 |
| 4,306,457 | 12/1981 | Fukui et al. | 73/861.77 |
| 4,700,579 | 10/1987 | Hall | 73/861.78 |
| 4,831,866 | 5/1989 | Forkert et al. | |
| 5,016,187 | 5/1991 | Fokert et al. | 73/861.77 X |
| 5,050,094 | 9/1991 | Kitano | 73/861.03 |

FOREIGN PATENT DOCUMENTS

| | | |
|---|---|---|
| 0016928 | 1/1982 | European Pat. Off. . |
| 0069170 | 8/1985 | European Pat. Off. . |
| 0326380 | 2/1989 | European Pat. Off. . |
| 2594221 | 3/1988 | France . |
| 2805191 | 9/1978 | Germany . |
| 3942857 | 5/1991 | Germany . |
| 187466 | 2/1937 | Switzerland . |

Primary Examiner—Thomas P. Noland
Assistant Examiner—William L. Oen
Attorney, Agent, or Firm—Nilles & Nilles

[57] ABSTRACT

A flow meter includes a rotor housing having an inlet, an outlet, and a bore extending axially through the housing from the inlet to the outlet, and a screw spindle arrangement including at least two rotary helical worm bodies which are disposed in the bore and which engage in a form fit manner within one another. A pulse generator is mounted on one of the worm bodies and triggers electrical pulses in the mating measuring transducer which are dependent upon the rotational speed of the worm body. The measuring transducer has a pulse-adjusting and pulse-shaping stage which adjusts the magnitude and/or frequency of the pulses relative to a volumetric flow rate of fuel to the bore. An electric counting mechanism receives the electric pulses from the pulse-adjusting and pulse-shaping stage and typically transmits these pulses to a display unit for display.

9 Claims, 2 Drawing Sheets

APPARATUS FOR MEASURING QUANTITIES OF LIQUID IN GASOLINE PUMPS OF MOTOR VEHICLE FILLING STATIONS

BACKGROUND OF THE INVENTION

1. Field of the Invention

The invention relates to an apparatus, based on the principle of the displacer counter, for measuring quantities of liquid in gasoline pumps of motor vehicle filling stations during a fuelling process.

2. Discussion of the Related Art

For measuring quantities of liquid supplied to gasoline pumps of motor vehicle filling stations, it is generally known and common practice to use displacer counters, such as liquid measuring motors constructed in the manner of a piston slide valve. Such liquid measuring motors have the drawback that the liquid to be measured has to be supplied via a rotary slide valve to periodically and successively separated working chambers and connected, in a further control channel, to the outlet. During said process the liquid changes direction several times. There is also, in many cases, no linear correlation between revolution and throughflow volume. Finally, problems arise with adjustment of the delivery volume through piston stroke movement if high precision is an important factor and the counters, for billing measurements in the filling station business, have to be calibrated and regularly recalibrated under operating conditions.

EP 0 016 928 B1 discloses a throughflow measuring device, which operates as a flow meter and has a cylindrical rotational solid having, on its outer periphery, helical turns which act as flow-past vanes and generate a torque at the rotational solid.

In a throughflow measuring device according to EP 0 069 170 B1, likewise operating as a flow meter, a turbine wheel is used as an impeller wheel, its rotational speed and hence the throughflow of the liquid being measured using the light barrier principle. The electrical signals are supplied to an electronic measuring device and converted into an electrical measured variable. The throughflow measuring device is intended particularly for use as a fuel consumption meter for motor vehicles.

In each of said known throughflow measuring devices, only a single rotational solid is provided in the flow channel. The measuring accuracy and appropriateness for verification of the throughflow measurement of liquid fuels in filling stations therefore depend exclusively on the cross-section of flow along said rotational solid as well as upon the shaping of the helical turns.

A screw spindle arrangement having a plurality of rotary screws which engage one into the other is known from CH-PS 187 466. One of the rotary screws is connected to a counting mechanism for indirect measurement of the throughflow quantity of flowable media, such as liquids, and is provided at one end with a driving gear which, via a speed-transforming gear, drives the pointers of the counting mechanism.

The drawback of said style of construction is that mechanical gear parts have to be used for transmission of the rotary motion with simultaneous speed reduction between the rotary screw and the counting mechanism pointers. A plurality of these mechanical gear parts have to be provided depending on the number of pointers to be set in rotation, and the gear parts have to be sealed off from the liquid to be measured and are also exposed to wear.

From DE 39 42 857 C1 it is known, when using a quite conventional piston-type device for measuring the dispensed volume of fuel, to couple the piston-type measuring device to an optoelectronic pulse generator, whose pulses generated as a function of the measured volume of fuel are fed into a computer head. The drawbacks described initially in connection with fluid measuring motors constructed in the manner of a piston slide valve also apply to this known form of construction.

An apparatus which is appropriate for verification and by means of which the throughflow may be measured and adjusted to a setpoint value is disclosed in U.S. Pat. No. 4,831,866. Measurement is effected by a volumetric displacement chamber. Adjustment is effected by electronic intervention into the pulse processing in such a way that a calibration factor for correcting the pulse number derived from the throughflow measuring device is automatically acquired during a fuelling process and is acquired after specific operating or dispensing intervals which each correspond to a specific volume of liquid.

From DE 28 05 191 A1, a recording device for dispensing goods, in particular liquid motor vehicle fuel, in filling stations is known in which, to simplify billing, two pulse generators are associated with a throughflow measuring device and supply two counting pulse trains to a test circuit which produces a counting signal if they match and an error signal if they do not match. What is involved here, however, is merely a coincidence circuit by means of which double checking may be effected when billing for the dispensed quantity of fuel.

OBJECTS AND SUMMARY OF THE INVENTION

The object of the invention is, in an apparatus of the type described initially which operates on the principle of a displacer counter, to make the conveying route during volumetric detection of the fuel dispensed during a motor vehicle fuelling process more rectilinear than is the case with piston-type measuring motors and electronically to counteract distortions of the measuring signal which arise during measured value conversion in the low flow velocity range.

Said object is achieved according to the invention by providing a flow meter comprising a rotor housing having an inlet, an outlet, and a bore extending axially through the housing from the inlet to the outlet, and a screw spindle arrangement including at least two rotary helical worm bodies which are disposed in the bore and which engage in a form fit manner within one another. A pulse generator is mounted on one of the worm bodies and triggers electrical pulses in the mating measuring transducer which are dependent upon the rotational speed of the worm body. The measuring transducer has a pulse-adjusting and pulse-shaping stage which adjusts the magnitude and/or frequency of the pulses relative to the volumetric flow rate of fuel to the bore. An electric counting mechanism receives the electric pulses from the pulse-adjusting bore. An electric counting mechanism receives the electric pulses from the pulse-adjusting and pulse-shaping stage and typically transmits these pulses to an arithmetic unit for display.

Compared to liquid measuring motors constructed in the style of a piston slide valve, screw spindle counters offer the advantage of a more rectilinear throughflow of the liquid to be measured as well as a simpler style of construction which is less susceptible to faults and has correspondingly fewer structural parts. Screw spindle counters are advantageously made of metal materials. This results in better sliding properties for the throughflow liquid than in liquid measuring motors constructed in the style of a piston slide valve, which mostly have plastic structural parts, as well as in the structural parts being more resistant to aggressive constituents of the liquid to be measured.

The correction circuit stage is provided for converting the generally sinusoidal signals supplied by the measuring transducer into pulse signals which may then be evaluated in the electric counting mechanism. Threshold criteria—mostly the zero crossing of the output signal supplied by the measuring transducer - are used as a rule for pulse generation. At low flow rates of the volume of liquid to be measured, in particular when the flow of dispensed fuel starts up and eases off at the beginning and end of the fuelling process, distorted or non-linear output signals of the measuring transducer arise and prevent an exact correlation between the counting pulses and the partial volumes of fuel for measurement associated with said pulses. The pulse correction circuit counteracts said behaviour in that its sensitivity to the output signals of the measuring transducer is artificially raised at lower flow rates, and hence at lower rotational speeds of the worm body connected to the pulse generator.

Said sensitivity control is further utilized to allow the volumetric value of the pulses to be calibrated and re-calibrated by pulse adjustment. By means of such an electronic correction, the measured volume values may be adjusted in adaptation to greater differences between operating temperature and design temperature and to the resultant differences in density.

In an advantageous development of the invention, the pulse generating apparatus takes the form of a pulse disc which is connected to one of the worm bodies. In connection with the measuring transducer installed in a fixed manner in the rotor housing and advantageously with the pulse pulse correction circuit integrated therein, the revolutions of the worm body are converted into pulses, whose magnitude, number or repetition rate is directly proportional to the dispensed fuel quantity.

In a further development of the invention, the pulses generated by rotation of the worm bodies are electronically adjustable in terms of their magnitude or repetition rate by externally acquired control or check-back pulses, which may be derived from the arithmetic unit of the electronic counting mechanism and are adjustable or readjustable as a function of operating or climatic parameters as well as being tunable to an arithmetical ratio relative to the throughflow quantity of dispensed fuel.

BRIEF DESCRIPTION OF THE DRAWINGS

An embodiment of the apparatus for measuring liquid quantities is explained in greater detail in the description and is illustrated in the drawing, in which.

DETAILED DESCRIPTION OF THE PREFERRED EMBODIMENTS

Figure 1:
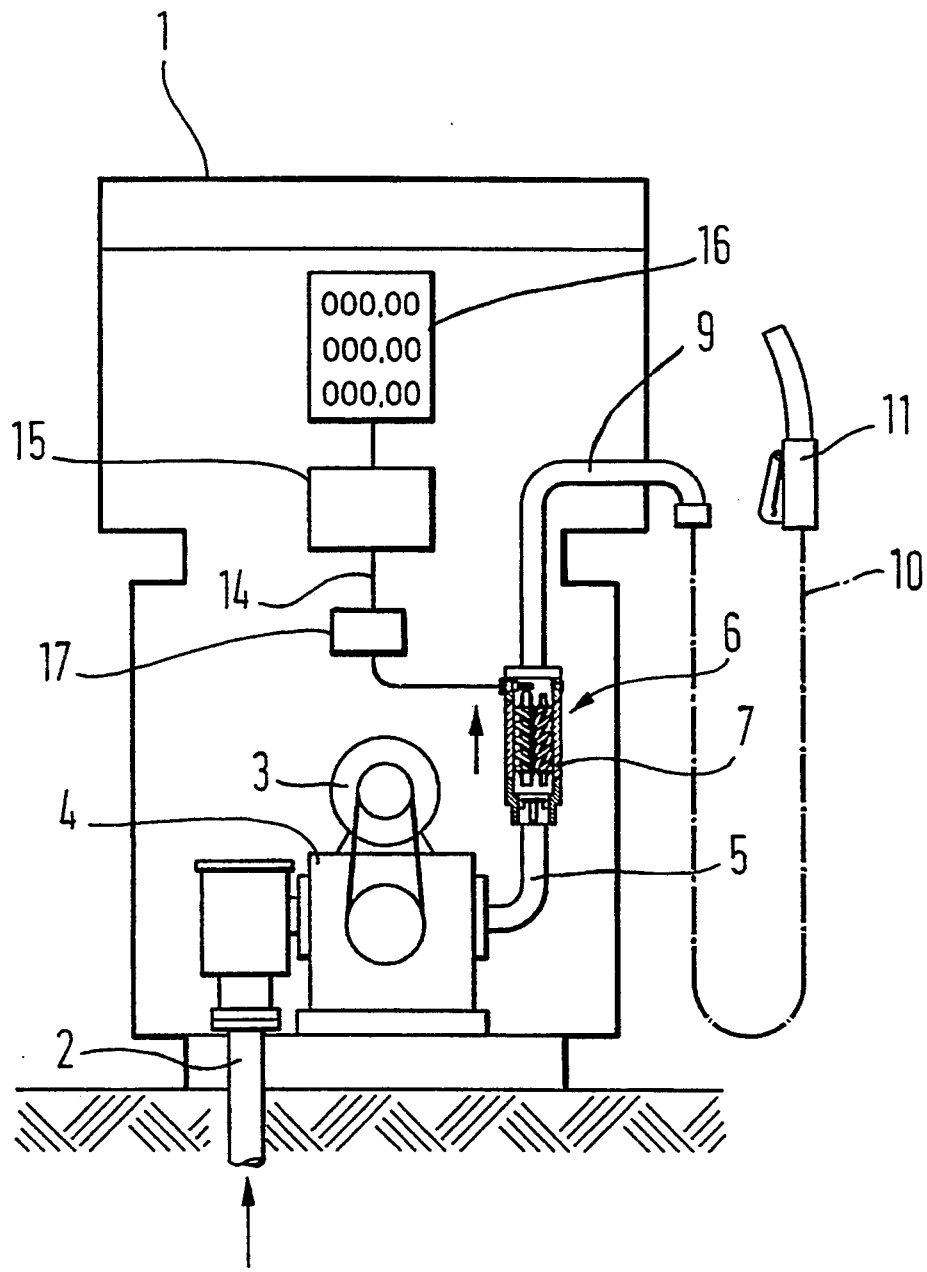
FIG. 1 shows a purely diagrammatic internal view of a gasoline pump having a liquid measuring motor shown in section.

From an underground storage tank for fuel, e.g. gasoline, which is not shown in FIG. 1 of the drawing, an intake tube 2 leads through the base of a gasoline pump housing 1 to a fuel delivery pump 4, which is drivable by its own drive motor 3. The fuel conveyed upwards during a vehicle fuelling process passes via piping 5 to a screw spindle counter 6 acting as a liquid measuring motor in the bottom explosion-protected region of the gasoline pump housing 1 and continues via piping 9 to a gasoline pump hose 10 having a dispensing valve 11 connected to its end.

Figure 2:
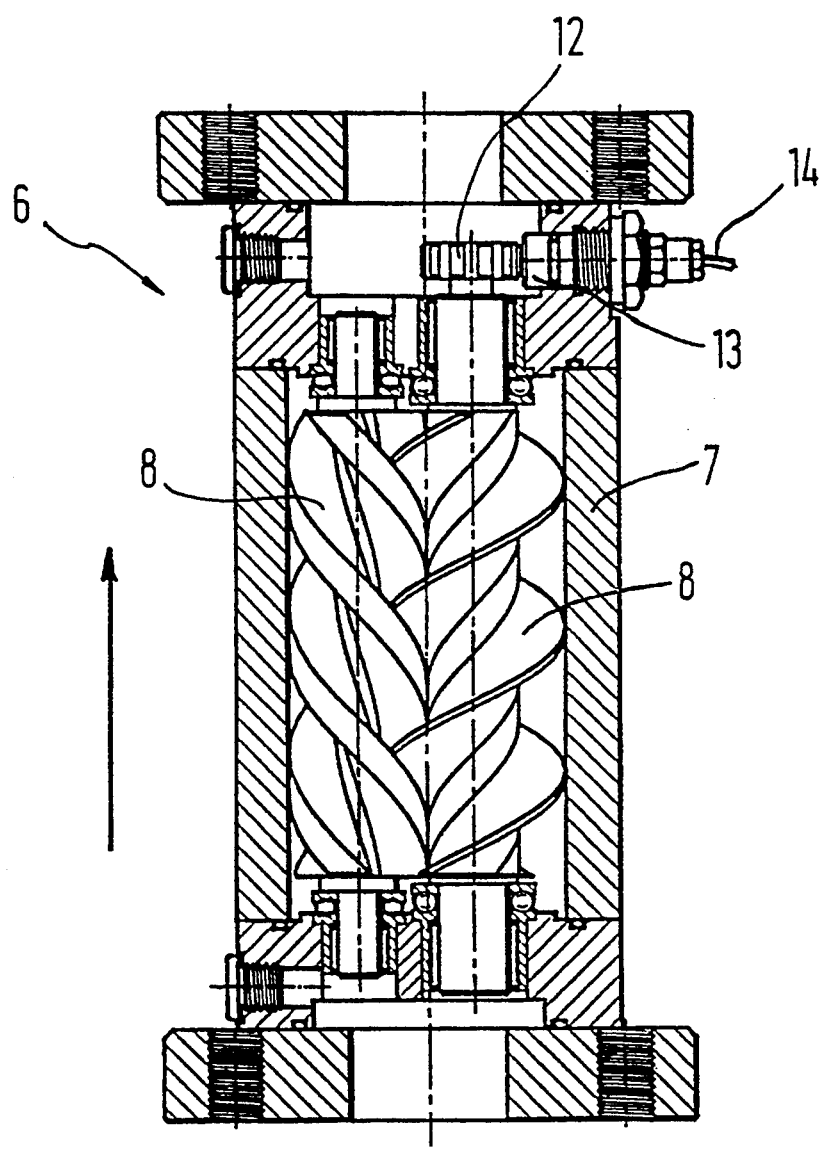
FIG. 2 shows a section through a screw spindle counter serving as a liquid measuring motor.

As FIG. 2 shows, two helical worm bodies 8 which engage in a form-fit manner one into the other are supported in control bore of rotor housing 7 of the screw spindle counter 6 and are set in rotation by the liquid flowing axially through them during fuelling of a motor vehicle. One of said worm bodies 8 acts as an output shaft of the liquid measuring motor and carries on its end a pulse-generating apparatus 12 in the form of a pulse disc. With the aid of said lock washer, the revolutions of the worm body 8 connected to said disc are converted e.g., inductively, in a measuring transducer 13 which penetrates the rotor housing 7, into pulses whose magnitude, number or repetition rate is directly proportional to the dispensed fuel quantity.

The pulse generator of the measuring transducer 13 is connected, outside of the rotor housing 7, to an electric line 14 leading to an electronic counting mechanism 15, which has an arithmetic unit and is connected to a display unit 16 in order to display the unit price, the dispensed fuel quantity and the price to pay in a window of the gasoline pump housing 1 for the benefit of the filling station customer. The fuelling data acquired after conversion of the measuring data may be supplied to a monitor associated with each longitudinal side of a filling station island comprising a plurality of gasoline pumps and may be read by the filling station customer.

The pulse generator integrated in the measuring transducer 13 comprises a correction circuit 17, by means of which the pulses generated by rotation of the worm bodies 8 may be electronically adjusted for calibration purposes before being supplied to the electronic counting mechanism 15 with the electronic counter. During said process, the magnitude or repetition rate of the pulses is varied by externally acquired control or check-back pulses derived from the electronic counter of the electronic counting mechanism 15 in such a way that they are, for example, tuned to an arithmetical ratio relative to the throughflow quantity of the dispensed fuel. The pulse correction circuit 17 also converts the generally sinusoidal signals supplied by the measuring transducer 13 into pulse signals which may then be evaluated in the electronic counting mechanism 15 threshold criteria, mostly the zero crossing the output signal supplied by the measuring transducer 13, are used as a rule for pulse generation. At low liquid flow rates, in particular when the flow of dispensed fuel starts up and eases off at the beginning and end of a fueling process, distorted or non-linear output signals of the measuring transducer arise and prevent an exact correlation between the counting pulses and the partial volumes of fuel for measurement associated with these pulses. The pulse correction circuit counteracts this behavior in that its sensitivity to the output signals of the measuring transducer is artificially raised at lower flow rates by increasing the magnitude and/or frequency of the pulses measured by the measuring transducer 13 is artificially raised at lower flow rates, and hence at lower flow rates, and have lower rotational speeds of the worm body connected to the pulse generator. In the electronic counter of the electronic counting mechanism 15, said control or check-back pulses are adjustable as a function of specific operating or climatic parameters or, if need be, are readjustable, say for calibration purposes, by staff designated for said task.

We claim:

1. Apparatus for measuring liquid supplied by gasoline pumps of motor vehicle filling stations during a fueling process, said apparatus comprising:
   (A) a rotor housing having an inlet, an outlet, and a bore extending axially through said housing from said inlet to said outlet;
   (B) a screw spindle arrangement including at least two rotary helical worm bodies which extend axially through said bore and which engage in a form fit manner with one another;
   (C) a pulse generator which is mounted on one of said worm bodies;
   (D) a measuring transducer mounted in said rotor housing adjacent said pulse generator, said pulse generator triggering electrical pulses in said measuring transducer which are dependent upon the rotational speed of said one worm body, said measuring transducer including a pulse correction circuit which adjusts one of the magnitude and the frequency of said pulses relative to a throughflow quantity of fuel dispensed by said apparatus, thereby forming adjusted electrical pulses; and
   (E) an electric counting mechanism which receives said adjusted electrical pulses from said pulse correction circuit and which includes an electronic counter and a display device.

2. Apparatus as claimed in claim 1, wherein said pulse generator comprises a pulse disc mounted on an end of a shaft of said one worm body.

3. Apparatus as claimed in claim 1, wherein said pulse generator cooperates inductively with said measuring transducer.

4. Apparatus as claimed in claim 1, wherein said pulse correction circuit adjusts said pulses under the control of one of externally acquired control pulses and check-back pulses derived from said electronic counter.

5. Apparatus as claimed in claim 4, wherein said pulse correction circuit increases at least one of the magnitude and frequency of said pulses at low volumetric flow rates.

6. Apparatus as claimed in claim 4, wherein said pulses delivered by said electronic counter are adjustable as a function of one of operating parameters and climatic parameters.

7. Apparatus for measuring liquid supplied by gasoline pumps of motor vehicle filling stations during a fueling process, said apparatus comprising:
   (A) a rotor housing having an inlet, an outlet, and a bore extending axially through said housing from said inlet to said outlet;
   (B) a screw spindle arrangement including at least two rotary helical worm bodies which extend axially through said bore and which engage in a form fit manner with one another;
   (C) a pulse generator which is mounted on one of said worm bodies and which comprises a pulse disc mounted on an end of a shaft of said one worm body;
   (D) a measuring transducer mounted in said rotor housing adjacent said pulse generator and inductively coupled to said pulse generator, said pulse generator triggering electrical pulses in said measuring transducer which are dependent upon the rotational speed of said one worm body, said measuring transducer including a pulse correction circuit which varies one of the magnitude and the frequency of said pulses relative to a throughflow quantity of fuel dispensed by said apparatus, thereby forming adjusted electrical pulses; and
   (E) an electric counting mechanism which receives said adjusted electrical pulses from said pulse correction circuit and which includes an electronic counter and a display device.

8. Apparatus as claimed in claim 7, wherein said pulse correction circuit adjusts said pulses under the control of one of externally acquired control pulses and check-back pulses delivered by said electronic counter.

9. Apparatus as claimed in claim 7, wherein said pulses are adjustable as a function of one of operating parameters and climatic parameters.

* * * * *